United States Patent [19]
Rosenbrg

[11] Patent Number: 5,872,599
[45] Date of Patent: *Feb. 16, 1999

[54] METHOD AND APPARATUS FOR SELECTIVELY DISCARDING DATA WHEN REQUIRED IN ORDER TO ACHIEVE A DESIRED HUFFMAN CODING RATE

[75] Inventor: Jonathan David Rosenbrg, North Plainfield, N.J.

[73] Assignee: Lucent Technologies Inc., Murray Hill, N.J.

[*] Notice: The term of this patent shall not extend beyond the expiration date of Pat. No. 5,696,563.

[21] Appl. No.: 400,706

[22] Filed: Mar. 8, 1995

[51] Int. Cl.$^6$ .............................. H04N 5/14; H04N 7/12; H04N 11/02; H04N 11/04

[52] U.S. Cl. ........................... 348/416; 348/699; 341/65; 341/67; 341/106

[58] Field of Search .................................... 348/390–416, 348/18, 19, 14, 400, 699; 358/427; 341/60–68, 106, 55; 375/240, 253; H04N 5/14

[56] References Cited

U.S. PATENT DOCUMENTS

| | | | |
|---|---|---|---|
| 3,701,111 | 10/1972 | Cocke et al. ........................... | 340/172.5 |
| 4,302,775 | 11/1981 | Widergreen et al. .................... | 358/136 |
| 4,385,363 | 5/1983 | Widergreen et al. .................... | 364/725 |
| 4,396,906 | 8/1983 | Weaver .................................... | 340/347 |
| 4,541,012 | 9/1985 | Tescher .................................... | 358/133 |
| 4,672,441 | 6/1987 | Hoelzlwimmer et al. .............. | 358/135 |
| 4,700,175 | 10/1987 | Bledsoe .................................... | 340/347 |
| 4,704,628 | 11/1987 | Chen et al. ............................... | 358/136 |
| 5,079,630 | 1/1992 | Golin et al. .............................. | 358/133 |
| 5,172,228 | 12/1992 | Israelson .................................. | 358/133 |
| 5,389,965 | 2/1995 | Kuzma ..................................... | 348/14 |
| 5,410,352 | 4/1995 | Watanabe ................................. | 348/505 |
| 5,420,639 | 5/1995 | Perkins .................................... | 348/418 |
| 5,463,699 | 10/1995 | Wilkinson ............................... | 382/246 |
| 5,541,595 | 7/1996 | Meyer ...................................... | 341/67 |
| 5,541,640 | 7/1996 | Larson ..................................... | 348/19 |
| 5,550,541 | 8/1996 | Todd ........................................ | 341/51 |
| 5,612,747 | 3/1997 | Hartung .................................. | 348/422 |
| 5,696,563 | 12/1997 | Rosenberg .............................. | 348/699 |

FOREIGN PATENT DOCUMENTS

| | | | |
|---|---|---|---|
| 0498578A2 | 8/1992 | European Pat. Off. ....... | H04N 7/133 |
| 0597647A2 | 5/1994 | European Pat. Off. ....... | H04N 7/133 |

OTHER PUBLICATIONS

Huffman, David A., "A Method for the Construction of Minimum–Redundancy Codes", Proceedings of the I.R.E., vol. 40, Sep. 1952, pp. 1098–1101.

*Primary Examiner*—Tommy P. Chin
*Assistant Examiner*—David R. Vincent

[57] ABSTRACT

Apparatus and methods are provided for generating an output signal representing a selectively reduced coding rate for use in compressing a digital signal. The digital signal includes a plurality of digital sets wherein at least one of the digital sets are non-unique. A current coding rate and a threshold coding rate compared to determine whether the current coding rate satisfies a predetermined criteria. In response to the determination, at least one of the digital sets are selectively discarded, a rate difference resulting from selectively discarding at least one of the plurality of digital sets is determined, and the current coding rate is recalculated using the determined rate difference.

35 Claims, 9 Drawing Sheets

METHOD AND APPARATUS FOR SELECTIVELY DISCARDING DATA WHEN REQUIRED IN ORDER TO ACHIEVE A DESIRED HUFFMAN CODING RATE

CROSS-REFERENCE TO RELATED APPLICATIONS

The present invention is related to U.S. patent application Ser. No. 08/399,084, Attorney Docket No. Rosenberg 2, entitled "Apparatus and Methods for Determining an Initial Huffman Coding Rate"; U.S. Pat. No. 5,696,563, Attorney Docket No. Rosenberg 4, entitled "Apparatus and Methods for Performing Huffman Coding"; and U.S. Pat. No. 5,612,747, Attorney Docket No. Hartung 10-1, entitled "Method and Apparatus for Vector Quantization Caching in a Real Time Video Coder", which are all commonly assigned to the assignee of the present invention, and which are filed concurrently herewith. The disclosures of these related Applications are incorporated herein by reference.

TECHNICAL FIELD OF THE INVENTION

The present invention relates generally to signal compression, and in particular to apparatus and methods for selectively reducing a Huffman Coding rate.

BACKGROUND

Conventional communication systems, including networks, include two or more interconnected nodes wherein each node functions as a junction point within the system. Information is transferred between nodes using electric, light, and/or radio waves, and typically involves transferring one or more codewords. Each codeword represents a symbol in a symbol set, such as an alphabet, and includes data for use by, and/or instructions for, a receiving node. Each codeword is defined by one or more binary digits, or bits.

Communication systems have limited bandwidth. In other words, there exists an upper limit, or maximum number, of bits which may be transferred per unit time. Contrary to this limitation is the need of many communication systems to transfer large quantities of symbols. This is particularly true in video applications, such as videophone and direct television, where video symbols typically represent chrominance and/or luminance values for picture elements ("pixels"), motion information, instructions indicating the content of the chrominance, and luminance values or marker codes. Marker codes are sync codes.

Data compression techniques have been incorporated into many communication systems to increase the number of codewords transferred given the available bandwidth. These techniques eliminate unnecessary data, redundancies, and the like from transmissions. Huffman Coding is one popular approach which is commonly used for video, audio/speech and high-speed data compression. Huffman Codes use variable length symbols wherein each symbol's length depends upon the probability of occurrence of the one or more codewords defining it.

Assume for example a symbol set of {bear, dart, wear, beet}. Each of the codewords used to represent the symbol set has a length inversely proportional to its symbol's usage. Assuming this symbol set is used in the English language, "wear" is likely to be said more often than "bear", more often than "dart", and more often than "beet". The coding may accordingly be {be, dar, w, beet}, where codeword length is equivalent to the number of letters. In point of fact, the English language presents another good example of variable length codewords wherein common words such as {it, in, a, car, the, if, I, a, an} are shorter than words used less frequently, such as {approximately, university, automobile, individually, myself, particularly}.

Source entropy is an optimal "loss-less" coding rate, in other words, the smallest average number of bits per symbol required to represent a particular symbol set or alphabet. Huffman Coding techniques have been found to reduce coding rates to nearly source entropy. In many conventional applications, such as video processing, however, the probability of all occurrences of the various symbols tends to change as the video image changes. This causes the current Huffman Codes to be an inefficient representation of the symbols. Worse, these changes typically occur at random.

The Huffman Codes accordingly cease to reduce coding rates to source entropy and require recalculation. This is often computationally difficult as the codeword for any one symbol depends on the probability of occurrence of the symbols in the alphabet. For large alphabets therefore each codeword, of which there are typically many, requires substantial computation.

One conventional solution periodically recalculates the Huffman Codes. Another solution determines the source entropy, and then estimates from that determination the coding rate for recalculating the Huffman Codes. Each approach is typically inaccurate, and in many situations demands substantially the same processing resource requirements needed to recalculate the Huffman Codes as when originally defined. The inability of conventional communication systems to generate, and regenerate, Huffman Codes to maintain substantially source entropy remains a dominant obstacle to producing high quality video, audio/speech and high-speed communication.

SUMMARY OF THE INVENTION

Communication systems have limited bandwidth, i.e., a maximum rate at which bits may be transferred per a given time period. Recall that compression techniques, and in particular Huffman Coding techniques, are incorporated into conventional signal compressing systems to increase information throughput, i.e., the number of codewords transferred given the available bandwidth.

Broadly, the present invention is directed to apparatus and methods for selectively reducing a coding rate in response to limited bandwidth in communication systems, including without limitation, processing system networks (including local and wide area networks), telephony systems (including videophone and cellular technologies), direct television systems, satellite systems, land-mobile radio systems, broadcast systems, data storage/retrieval systems, and the like, for example.

An apparatus in accordance with the principles of the present invention generates an output signal representing a selectively reduced coding rate for use in compressing a digital signal. The digital signal includes a plurality of digital sets wherein ones of the digital sets are non-unique. The apparatus includes receiving and processing means. The receiving means operates to receive an electric signal representing a current coding rate. The processing means operates to generate the output signal. The processing means selectively discards, or removes from consideration, one or more of the digital sets, preferably while the current coding rate is beyond a threshold coding rate, determines a coding rate difference resulting from the selectively discarded digital sets and recalculates the current coding rate using the rate difference. The output signal is then generated. An important aspect of any apparatus in accordance with the principles of the present invention is that it may be processing system, firmware or hardware based.

A method in accordance with the principles of the present invention concerns selectively reducing a current coding rate for use in compressing a digital signal. The digital signal includes a plurality of digital sets wherein ones of the digital sets are non-unique. A current coding rate and a threshold coding rate are preferably compared to determine whether the current coding rate satisfies a predetermined criteria, i.e., such as validity. Upon a determination that the current coding rate does not, or fails, to satisfy the predetermined criteria, i.e., such as invalidity, ones of the digital sets are selectively discarded or removed from consideration, a coding rate difference resulting from selectively discarding ones of the digital sets is determined, and the current coding rate is recalculated using the determined rate difference. This selective reduction process preferably repeats until the current coding rate is valid, at which time the output signal is generated.

One embodiment for using and/or distributing the present invention is as software. The software embodiment includes a plurality of processing system instructions which are stored to a storage medium. Preferred storage mediums include without limitation magnetic, optical, or semiconductor chip, as well as suitably arranged combinations thereof. The processing system instructions are readable by a processing system, and upon execution, operate to control at least one processing system for compressing a signal using Huffman Coding techniques in accordance with the principles of the present invention.

BRIEF DESCRIPTION OF THE DRAWINGS

For a more complete understanding of the present invention, and the advantages thereof, reference is now made to the following Detailed Description of the Invention, taken in conjunction with the accompanying drawings in which like numbers designate like parts, and in which.

DETAILED DESCRIPTION OF THE INVENTION

Figure 1:
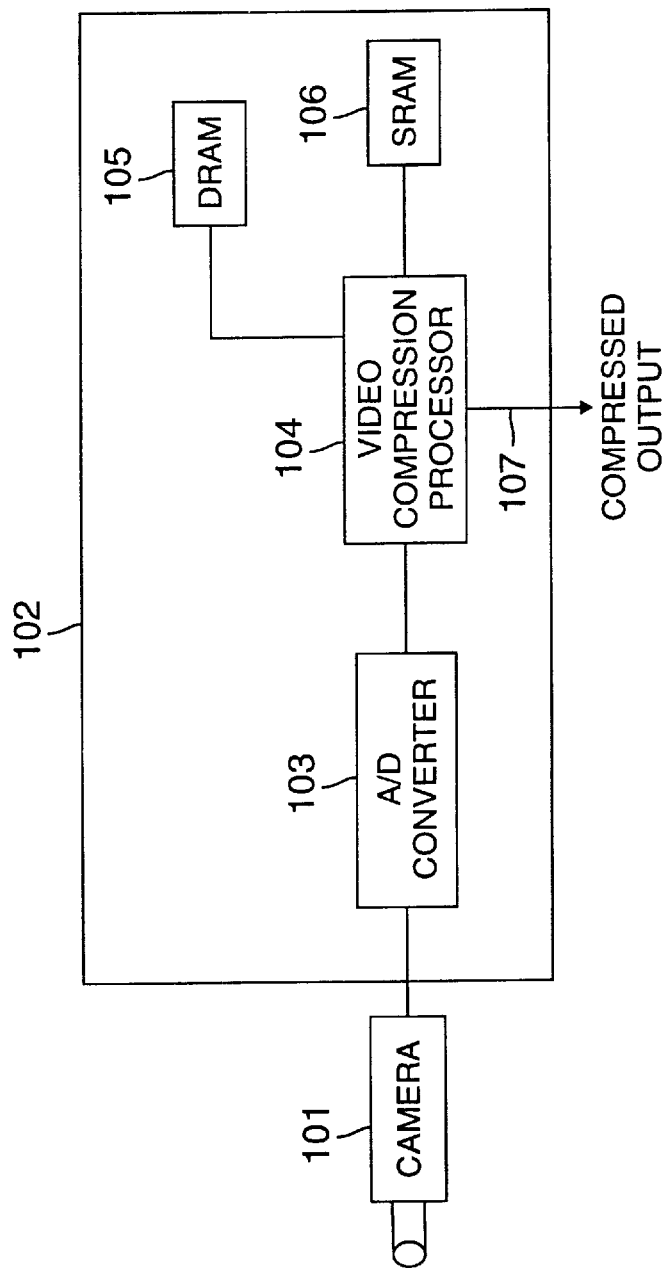
FIG. 1 illustrates a block diagram of one exemplary system for compressing video data in accordance with the principles of the present invention.

FIG. 1 illustrates a block diagram of one exemplary system for compressing video signals in which the principles of the present invention are particularly advantageous. The exemplary system includes a conventional video camera 101 and a video processing board 102. Video processing board 102 includes an analog-to-digital ("A/D") converter 103, a video compression processor 104 and two conventional memory storage devices, namely, a dynamic random-access memory ("DRAM") 105 and a static random-access memory ("SRAM") 106.

Video camera 101 may suitably be connected to A/D converter 103 to convert analog video signals produced by video camera 101 to a representative digital signal. A/D converter 103 may suitably be connected to video compression processor 104. Video compression processor 104 preferably has associated with it DRAM 105 as well as SRAM 106. Compressed video signals produced by video compression processor 104 may be transmitted over a data line 107.

In a preferred embodiment, camera 101 is a model no. YH-7B60, made by Sharp Corp., Osaka, Japan; A/D converter 103 is a model no. SAA7151, made by Philips' Gloeilampenfabrieken N.V., the Netherlands; and Video compression processor 104 is a model no. VCP rev 3, made by Integrated Information Technologies Inc., Santa Clara, Calif. USA. DRAM 105 and SRAM 106 are conventional suitably arranged storage devices. One preferred use of this video compression system is discussed in U.S. Pat. No. 5,612,747, Attorney Docket No. Hartung 10-1, which is commonly assigned to the assignee of the present invention and which is incorporated herein by reference.

Figure 2:
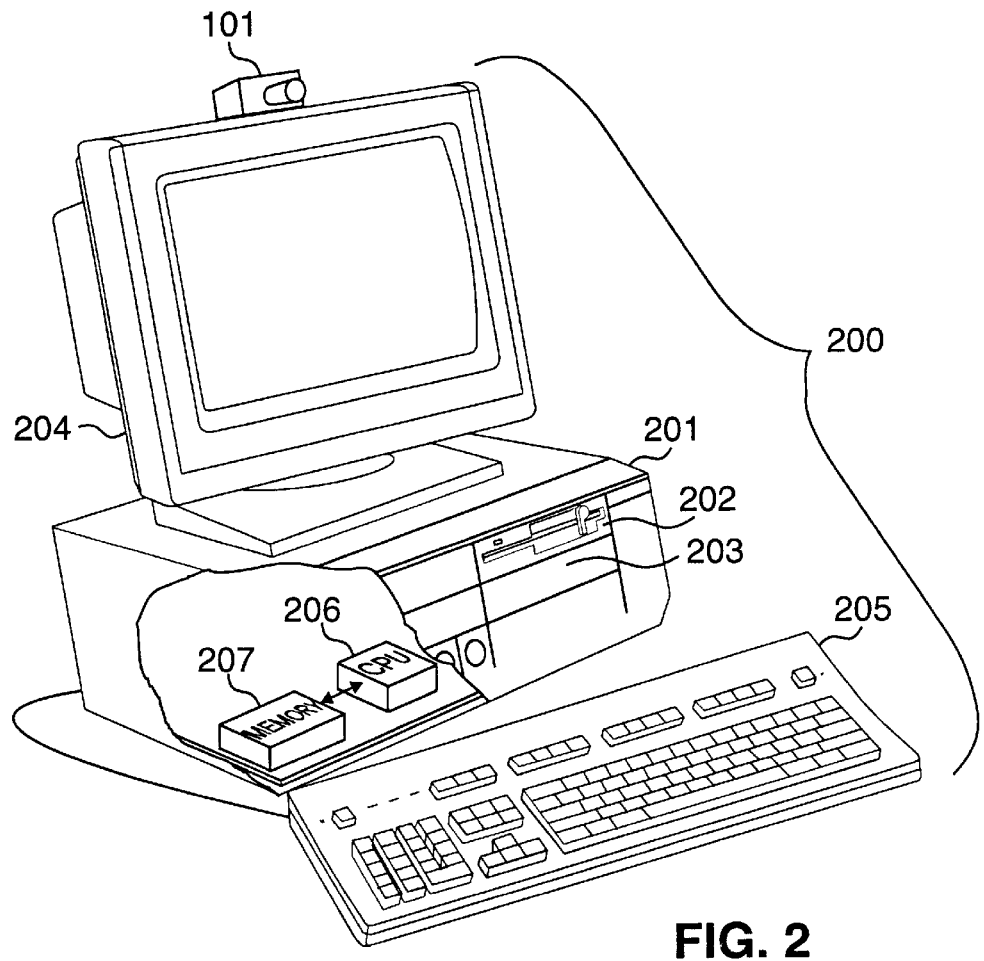
FIG. 2 illustrates an isometric view of one exemplary processing system for compressing video data in accordance with the principles of the present invention.

FIG. 2 illustrates an isometric view of an exemplary processing system 200 for compressing a video signal in accordance with the principles of the present invention. Processing system 200 is shown as a personal computer, and in one preferred embodiment is a model no. System 3333, by AT&T GIS, located in Dayton, Ohio. Processing system 200 may suitably be coupled with camera 101, and includes a hardware casing 201, having both a floppy disk drive 202 and a hard disk drive 203, a monitor 204 and a keyboard 205. Monitor 204 and keyboard 205 may be replaced by, or combined with, other conventional output and input devices, respectively.

Floppy disk drive 202 is operable to receive, read and write to external disks. Hard disk drive 203 is operable to provide fast access storage and retrieval. Floppy disk drive 202 may be replaced by or combined with any conventional suitably arranged structure for receiving and transmitting data and instructions, including without limitation, tape and compact disc drives, telephony systems and devices (including videophone technologies), and serial and parallel ports. In alternate embodiments, circuit boards, such as video processing board 102 of FIG. 1 for example, may be included.

Camera 101 is preferably coupled with processing system 200 through one of the aforementioned ports. In alternate embodiments, input video images may be received via one or more separate storage devices, such as a floppy disk or a compact disc, for example. An important aspect of the exemplary embodiment therefore is that data and/or instruction collection and compression need not occur coincidentally.

Note that hardware casing 201 is illustrated with a cut-away portion which includes a processing unit 206 suitably coupled with a memory storage device 207. Memory storage device 207 may be a random access memory ("RAM") or a read only memory ("ROM"), or other conventional suitably arranged memory storage device, such as DRAM 105 and/or SRAM 106 of FIG. 1 for example. Although processing system 200 is illustrated as having a single processing unit, a single hard disk drive and a single memory unit, processing system 200 may be equipped with a plurality of processing units and/or suitably arranged memory storage devices operable to cooperatively carry out the principles of the present invention.

It should be noted that although the present invention is particularly advantageous for use in video compression, the present invention is also well suited for use with other systems utilizing signal compression, including without limitation, processing system networks (including local and wide area networks), telephony systems (including videophone technologies), direct television systems, satellite systems, land-mobile radio systems, broadcast systems, information storage/retrieval systems, and the like.

Although a personal computer is utilized to illustrate one exemplary processing system embodiment, the principles of the present invention may be implemented within any processing system having conventional suitably arranged processing means for performing Huffman Coding in accordance with the principles of the present invention, including without limitation, cameras, videophones, telephones, televisions, sophisticated calculators and, hand-held, laptop/notebook, mini, mainframe and super computers, including RISC and parallel processing architectures, as well as within processing system network combinations of the foregoing. Conventional processing system architecture is more fully discussed in *Computer Organization and Architecture*, by William Stallings, MacMillan Publishing Co. (3rd ed. 1993), which is incorporated herein by reference.

Other preferred embodiments of the present invention include, without limitation, implementations in firmware or hardware. Such exemplary embodiments may include suitably arranged circuitry, including programmable logic devices, such as PALs (programmable array logic), PLAs (programmable logic arrays) and DSPs (digital signal processors). Other exemplary embodiments may also include FPGAs (field programmable gate arrays) and ASICs (application specific integrated circuits), for example.

Figure 3:
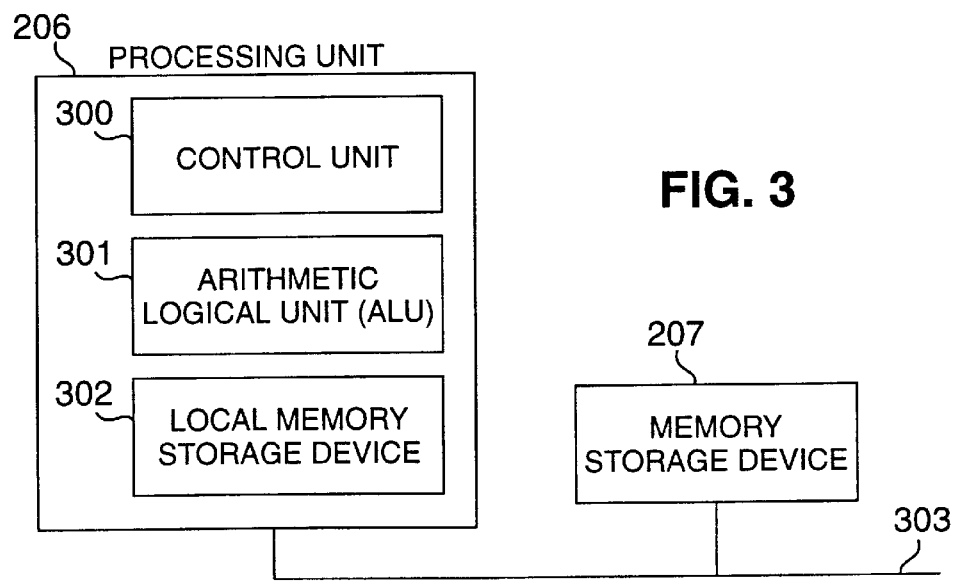
FIG. 3 illustrates a block diagram of an exemplary microprocessing system which may be utilized in conjunction with the processing system of FIG. 2.

FIG. 3 illustrates a block diagram of one exemplary microprocessing system which may be utilized in conjunction with processing system 200. The microprocessing system may be programmed to compress signals using Huffman Coding techniques in accordance with the principles of the present invention. The microprocessing system includes a single processing unit 206 coupled via data bus 303 with a single memory storage device 207. Memory storage device 207 is operable to store one or more processing system instructions which processing unit 206 is operable to retrieve and execute. Processing unit 206 includes a control unit 300, an arithmetic logic unit ("ALU") 301, and a local memory storage device 302, such as, stackable cache or a plurality of registers, for example. Control unit 300 is operable to fetch processing system instructions from memory storage device 207. ALU 301 is operable to perform a plurality of operations, including addition and Boolean AND needed to carry out those instructions. Local memory storage device 302 is operable to provide local high speed storage used for storing temporary results and control information.

Figure 4A:
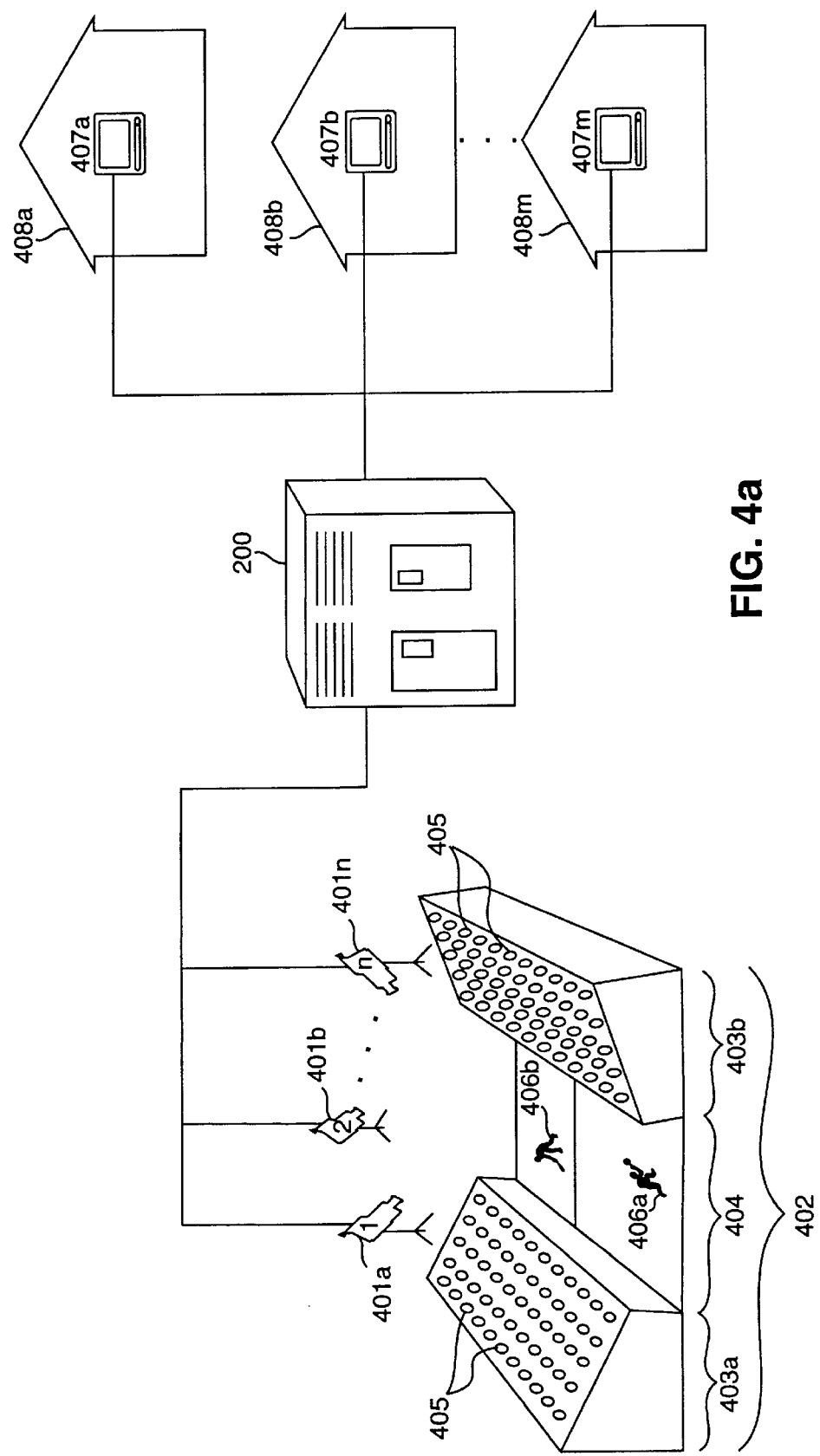
FIG. 4a illustrates a block diagram of an exemplary video processing system in accordance with the principles of the present invention.

FIG. 4a illustrates a block diagram of an exemplary video/audio processing system in which the present invention is particularly advantageous. The exemplary system includes a single processing system 200, illustrated as a mainframe computer, coupled suitably with a plurality of conventional video cameras 401a–401n. Video cameras 401a–401n are positioned about a tennis stadium 402. Tennis stadium 402 includes two grand stands 403a, 403b and a tennis court 404. Each of the grand stands 403a, 403b includes a plurality of seats, some of which will be occupied by spectators 405 during a tennis match, as illustrated. Tennis court 404 is shown to include two tennis players 406a, 406b who oppose one another in the tennis match.

One or more of the video cameras 401a–401n operate to capture the tennis match from which representative video and/or audio signals are produced. The produced signals are input to processing system 200 wherein they are processed and compressed using Huffman Coding techniques in accordance with the principles of the present invention to produce one or more output signals. The produced output signals are transmitted to a plurality of televisions 407a–407m. The televisions 407a–407m are located within a plurality of homes 408a–408m.

Figure 4B:
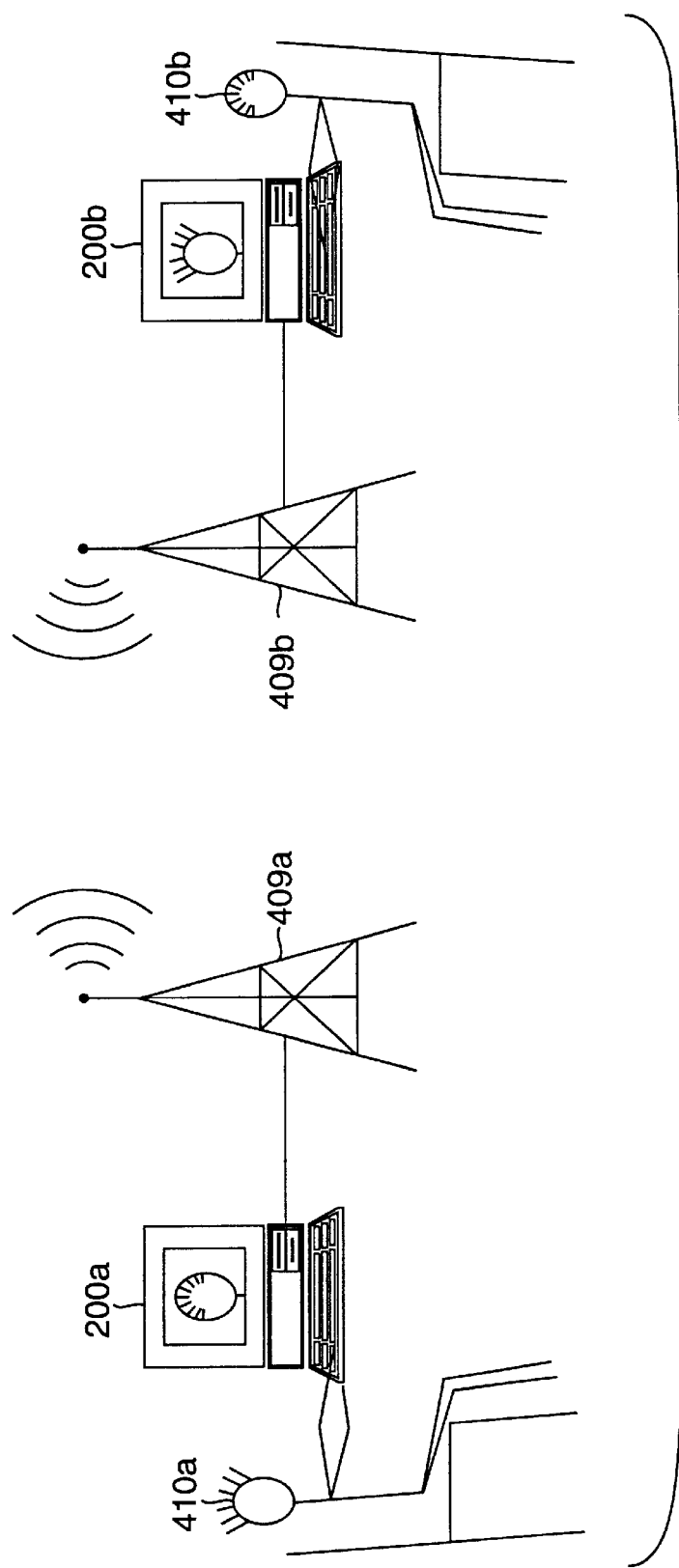
FIG. 4b illustrates a block diagram of an exemplary processing system-based wireless local area network including videophone technologies in accordance with the principles of the present invention.

FIG. 4b illustrates a block diagram of an exemplary processing system-based wireless local area network ("LAN") in which the present invention is particularly advantageous. The illustrated LAN includes two exemplary processing system nodes 200a, 200b, shown as personal computers. Each of the processing system nodes 200a, 200b is coupled suitably with a conventional antenna 409a, 409b, respectively, and includes videophone technologies (not shown). Antennas 409a, 409b operate to transmit and receive wireless communications between processing system nodes 200a, 200b. The received wireless communications are processed utilizing representative electric signals. The illustrated LAN facilitates communications between users A and B, 410a, 410b, respectively, wherein each processing system node is operable to send, receive, process and compress video, audio and high speed signals in accordance with the principles of the present invention.

Figure 4C:
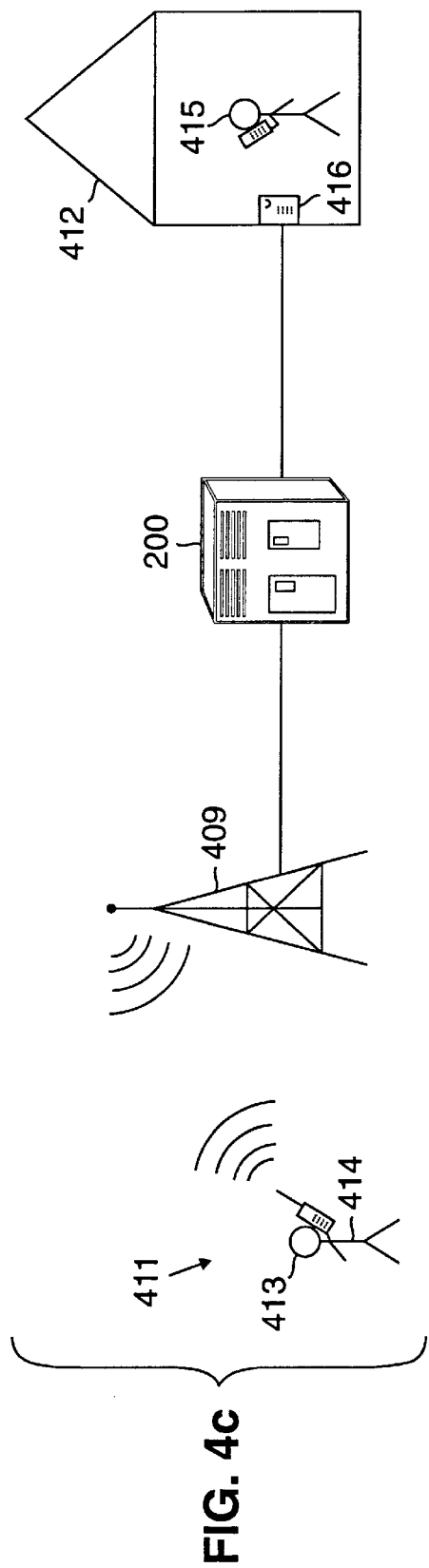
FIG. 4c illustrates a block diagram of an exemplary wireless communication system in accordance with the principles of the present invention.

FIG. 4c illustrates a block diagram of an exemplary wireless communication system in which the present invention is particularly advantageous. The illustrated system includes a processing system 200, illustrated as a mainframe computer, which facilitates communication between a first node 411 and a second node 412. The first node 411 includes a first caller 413, shown utilizing a cellular telephone 414. The cellular telephone 414 is operable to send and receive wireless communication signals. The second node 412 includes a second user 415, shown utilizing a conventional telephone 416. The conventional telephone 416 is operable to send and receive wired communication signals. Processing system 200 is suitably coupled with the conventional telephone 416 and a conventional antenna 409. Antenna 409 operates to send and receive wireless signals to and from the cellular telephone 414. Processing system 200 is operable to send, receive, process and compress audio signals in accordance with the principles of the present invention.

The video, audio and/or high speed signals of FIGS. 4a–4c are compressed using Huffman Coding techniques in accordance with the principles of the present invention to produce one or more output signals. The output signals are real physical signals.

Figure 5A:
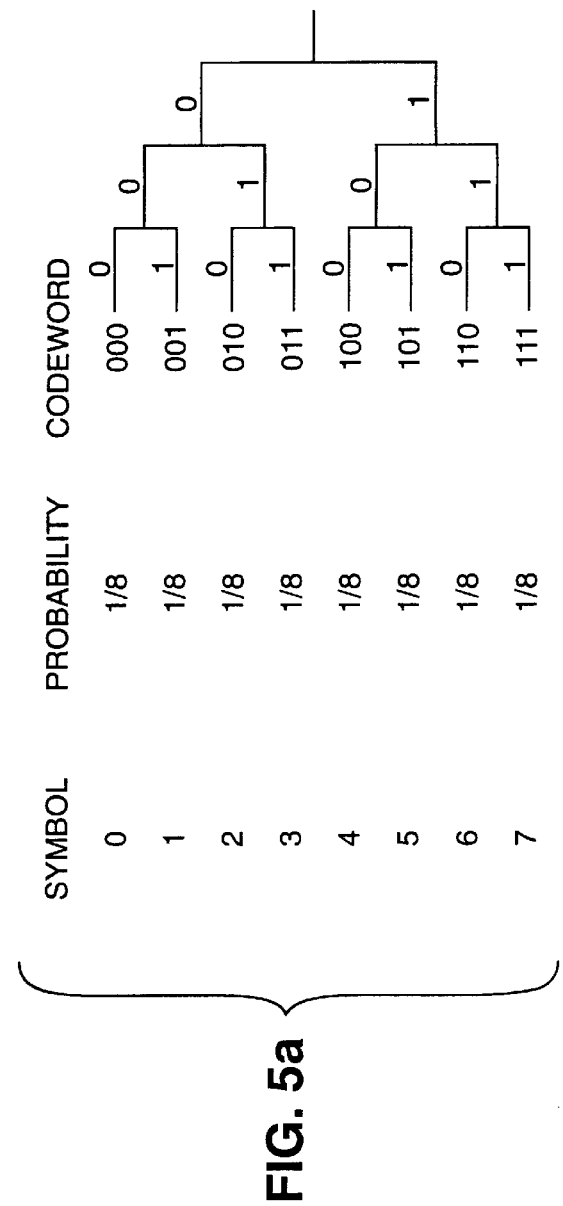
FIG. 5a illustrates a conceptual diagram for coding an equi-probable L-ary source.
Figure 5B:
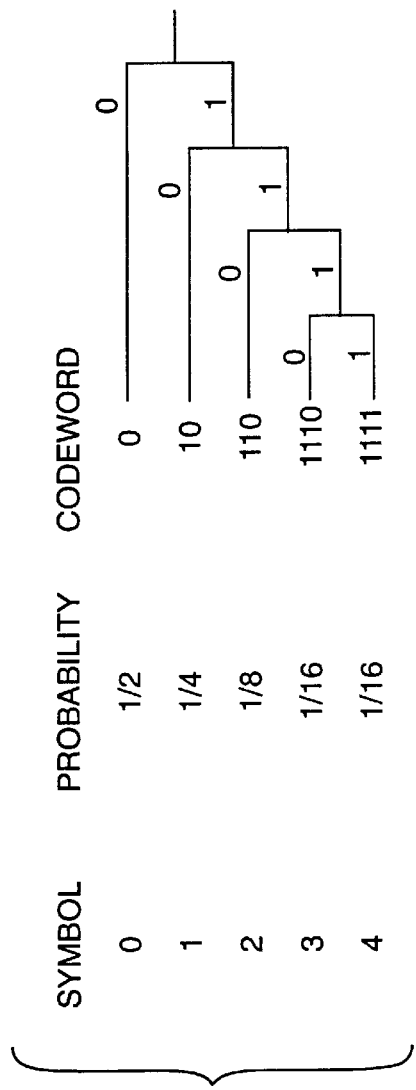
FIG. 5b illustrates a conceptual diagram for coding a nonequi-probable L-ary source.
Figure 5C:
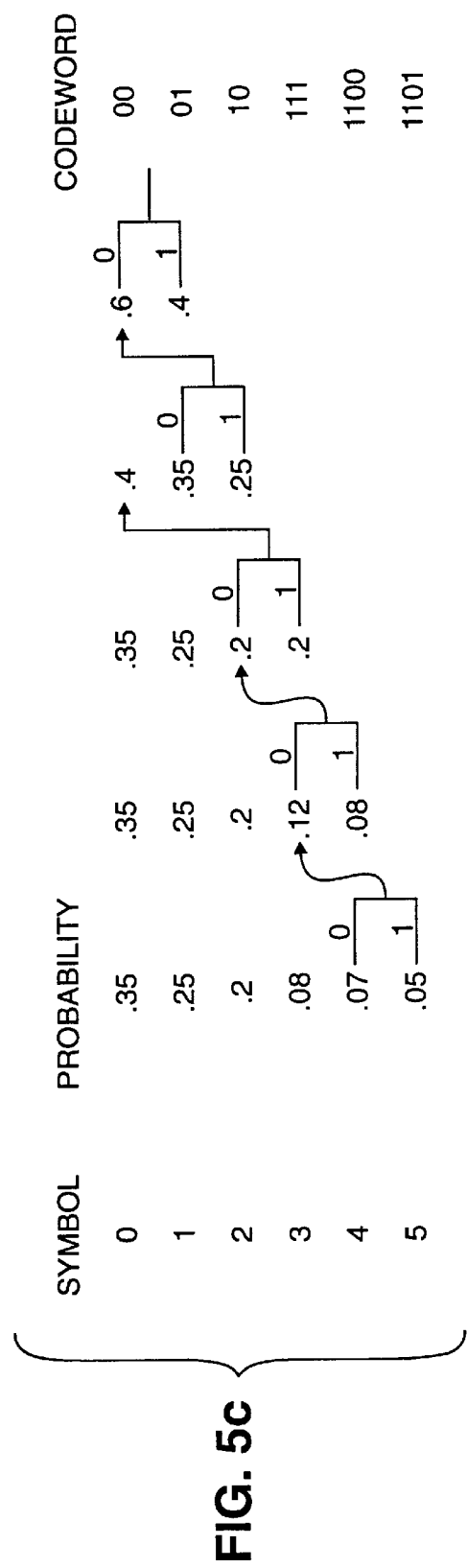
FIG. 5c illustrates a conceptual diagram for Huffman Coding a nonequi-probable L-ary source.

FIGS. 5a–5c illustrate the relationship between the entropy of a discrete source and the number of bits actually needed to encode that source. Block encoding is considered in each instance for which a symbol or sequence of symbols is mapped into a codeword, i.e., a block of bits. Recall that source entropy is a tight lower bound on minimum average codeword length.

FIG. 5a illustrates a conceptual diagram for coding an equi-probable L-ary source, wherein all symbols are equally probable and the number of symbols is a power of two, $L=2^k$. The source entropy is k bits per symbol. Possible outputs are divided into two equal groups of $2^{k-1}$ symbols. The successive splits of the groups are designated "upper" and "lower" and if a zero and a one, respectively, are assigned, a minimum length code is generated.

FIG. 5b illustrates a conceptual diagram for coding a nonequi-probable L-ary source, wherein the powers are of ½. The probabilities may be $P_i=(½)^{i+1}$, i=0, 1, . . ., L-2; $P_{L-1}=(½)^{L-1}$, for example. Similar to FIG. 5a, the output is revealed in stages wherein the symbols are ordered with the highest probability symbol at the top, and the symbols are split into groups of equal probability. The first symbol is in one group and all of the other symbols are in the other. Note that the length of the codeword for the ith symbol is given by $b_i=-\log_2 P_i$.

In general, where output probabilities are arbitrary, it may be assumed that codewords are of lengths $b_i$ and satisfy $$-\log_2 P_i \leq b_i < -\log_2 P_i + 1, \quad (1)$$

Averaging equation (1) over $P_i$, it is found that $$H(X) \leq L(X) < H(X)+1. \quad (2)$$

There accordingly exists an uniquely decipherable code whose word lengths conform to equation (1).

Huffman Codes provide codewords having a minimum average number of bits per symbol. Huffman Coding is a member of the class of codes called prefix codes wherein no codeword is the prefix of another codeword. For this codeword class, sequences of bits may be decoded uniquely and instantaneously.

FIG. 5c illustrates a conceptual diagram for Huffman Coding an nonequi-probable L-ary source. Huffman Coding techniques begin by listing the symbols in inverse order of probability. The two lowest probability symbols are combined, or added, into a group and a new list is formed with this group as a single entry. The list is resorted in inverse order of probability. The first step is repeated to form another list. At each step larger groups are formed and treated as a single entry. The process continues until the list contains only two entries. A zero is assigned to each member of one group and a one is assigned to each member of the other group. The process of grouping is then retraced; each of the groups is split and a zero and a one are assigned.

Figure 5D:
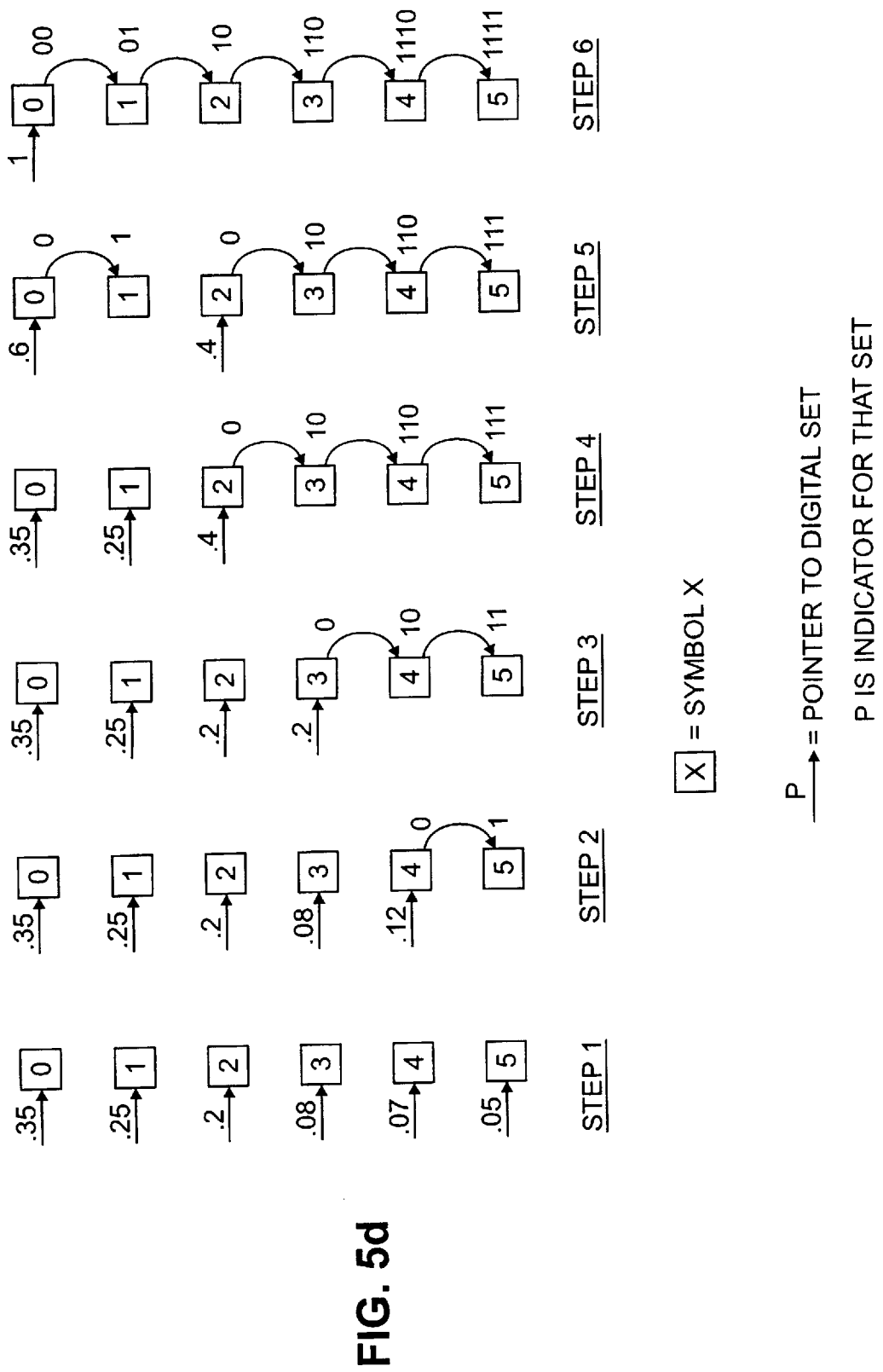
FIG. 5d illustrates the generation of pointers for the conceptual diagram of FIG. 5c.

FIG. 5d illustrates the generation of pointers for the conceptual diagram of FIG. 5c.

Figure 6:
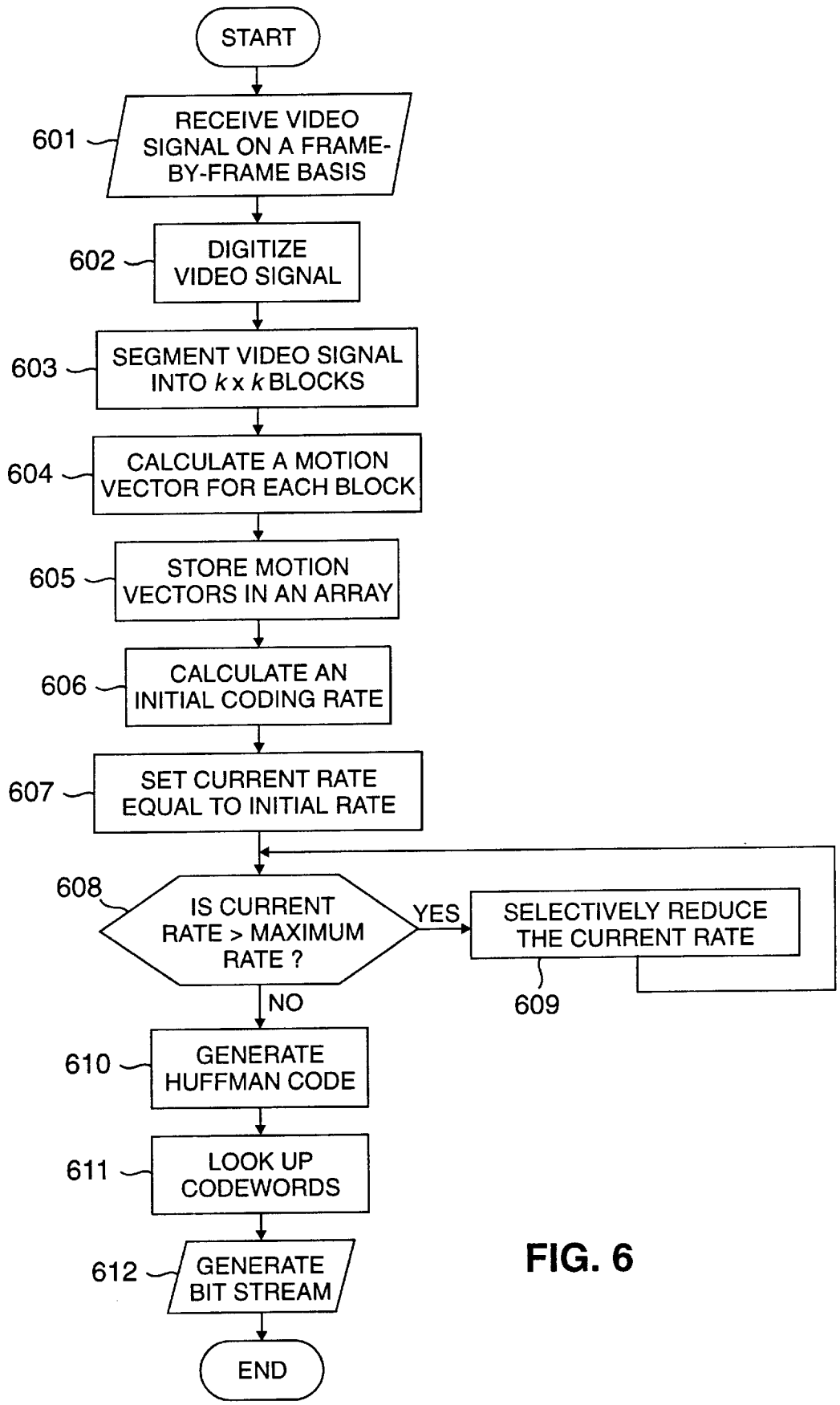
FIG. 6 illustrates an exemplary flow diagram for processing a received input signal utilizing Huffman Coding techniques in accordance with the principles of the present invention.

FIG. 6 illustrates an exemplary flow diagram for processing a received input signal utilizing Huffman Coding techniques in accordance with the principles of the present invention. For the purposes of the present discussion, the received input signal is assumed to be a video signal although the principles of the present invention may be advantageously used in conjunction with any signal compression apparatus, system or methodology. It is further assumed that the video signal is received at a constant frame rate, that each frame has a fixed number of bits, and that the bits are divided into three sections, namely, motion, vector quantization and scaler quantization information.

The process begins upon receipt of the input signal, processing block 601. If the input signal is an analog signal, it is preferably digitized, processing block 602. In the event that the signal is already in a digital format, this processing step is bypassed.

The video signal is preferably segmented into blocks wherein each block preferably contains k×k pixels, processing block 603. Although alternate embodiments may use non-square blocks. In the illustrative embodiment k is equal to eight, and each video frame preferably includes 8,960 pixels which are divided into 140 blocks (14 blocks horizontally and 10 blocks vertically). In alternate embodiments, particularly non-video embodiments, this processing step may be bypassed.

Motion estimation between consecutive video frames is preferably accomplished by comparing a current video frame with a previous reference video frame to determine one or more motion vectors corresponding to one or more blocks, processing block 604. This is preferably accomplished using forward motion estimation wherein each block of the current frame is searched for in the previous reference frame.

The techniques for calculating motion vectors are known, and may range from full search motion estimators to narrower selective search motion estimators, such as a coarse-fine search, for example. In video processing, selective search motion estimators are preferred due to reduced processing resource requirements. Assuming that a full search is done, it is preferable to use motion vectors in the range of −5 to 5 pixels at a resolution of 112×80, in increments of ⅓ pel, for a total of 31 possible motion vectors in two dimensions. Sub-pel motion estimation is accomplished by interpolating up to preferably 336×240 resolutions, and then searching in a range of −15 to 15 pels, in one pel increments.

The motion estimator is preferably biased towards a zero motion vector. If the prediction error for a particular motion vector is below a certain threshold, then zero motion is assumed in order to ensure that no motion is detected in regions of constant texture and to reduce source entropy coding rate as the zero-motion vector is coded with run-length codes. A motion vector is preferably obtained for each block.

Again, in alternate embodiments, particularly non-video embodiments, this processing step may be bypassed.

Recall that in order to compress signals for transmission (i.e., the motion vectors in the illustrated embodiment), a symbol set is typically utilized. More particularly, an array, or other suitable data structure or convention storage device, is preferably used as a catalogue representative of each unique symbol (presently, each unique motion vector) and its rate of occurrence, processing block 605.

An initial coding rate is calculated to determine the exact number of bits required to compress the symbols representing the motion vectors to be transmitted, processing block 606. This is preferably accomplished without generating the Huffman Code itself. The preferred processing steps for calculating an initial coding rate are more fully discussed in U.S. patent application Ser. No. 08/399,084, Attorney Docket No. Rosenberg 2, which is commonly assigned to the assignee of the present invention and which is incorporated herein by reference.

A variable representing the current coding rate is preferably set equal to the initial coding rate, processing block 607.

Recall that communication systems have limited bandwidth, i.e., a threshold or maximum rate at which bits may be transferred per a given time period. Recall further that compression techniques, and in particular Huffman Coding techniques, are incorporated into conventional signal compressing systems to increase information throughput, i.e., the number of codewords transferred given the available bandwidth. A determination is accordingly made as to whether the current coding rate is greater than the threshold or maximum rate, decisional block 608. If the current Huffman Coding rate is greater than the threshold rate, YES branch of decisional block 608, then the current rate is modified by selectively reducing the current rate, processing block 609. The preferred processing steps for selectively reducing the current rate are discussed in detail with reference to FIG. 7. The process preferably repeats these steps until the current coding rate is less than or equal to the threshold rate, decisional block 608.

If the current coding rate is less than or equal to the maximum rate, NO branch of decisional block 608, then a Huffman Code generated in accordance with the principles of the present invention, processing block 610. The preferred processing steps for generating the Huffman Code representing the current symbol table are more fully discussed in U.S. Pat. No. 5,696,563, Attorney Docket No. Rosenberg 4, which is commonly assigned to the assignee of the present invention and which is incorporated herein by reference.

In the illustrated embodiment, the codewords are preferably retrieved from a code book, processing block 611. A representative bit stream is generated, which in the illustrated embodiment represents the reconstructed video frame, processing block 612.

Figure 7:
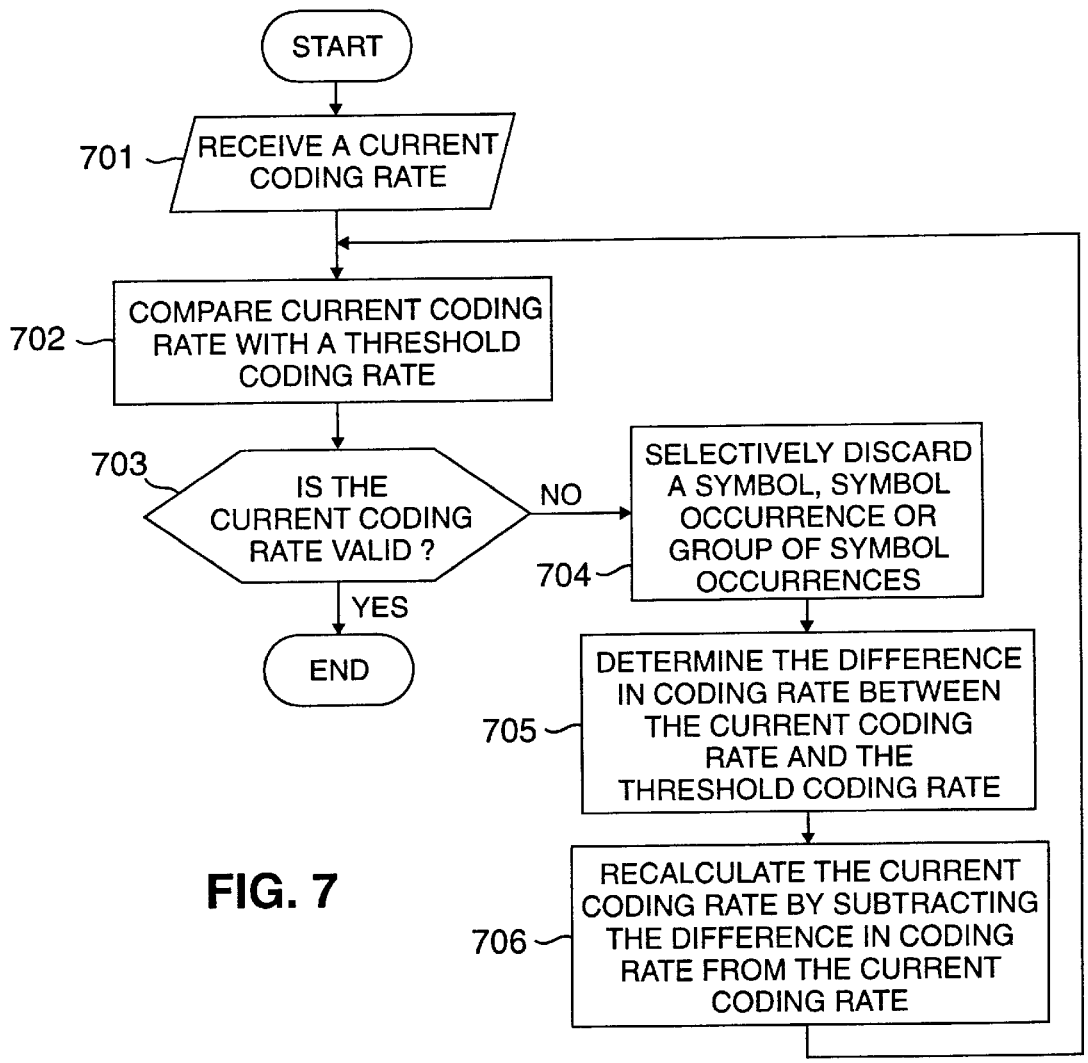
FIG. 7 illustrates an exemplary flow diagram for selectively reducing a Huffman Coding rate in accordance with the principles of the present invention.

FIG. 7 illustrates an exemplary flow diagram for selectively reducing a Huffman Coding rate for use in compressing a received digital signal. The digital signal includes a plurality of digital sets wherein ones of the digital sets are preferably non-unique. The exemplary process begins upon receipt of an electric signal representing the current coding rate, processing block 701.

An array, or other suitable data structure or conventional storage device, is preferably used to store each one of the plurality of digital sets once. Each digital set preferably represents a particular symbol, such as a motion vector in the illustrated embodiment, as previously discussed with reference to processing block 605 of FIG. 6. Each digital set preferably has an indictor associated therewith which represents the probability of occurrence, or frequency, of that symbol. Suitable conventional addressing and/or traversal techniques are preferably used to control and access the array.

The current coding rate is compared with a threshold coding rate to determine whether the current coding rate satisfies a predetermined criteria, such as validity, processing block 702. In the illustrated embodiment, the threshold coding rate represents the maximum bandwidth. If the current coding rate does not satisfy the predetermined criteria, or is invalid, NO branch of decisional block 703, then ones of the digital sets are selectively discarded, processing block 704. Selectively discarded, as used herein, includes removing from consideration. In the illustrated embodiment, selected ones of the motion vectors are discarded to reduce the number of bits required to represent the remaining motion vectors. If the current motion vector coding rate is greater than the maximum rate (preferably a fixed code parameter, typically 15% of the total bits/video frame), the current coding rate is preferably reduced by discarding the motion vector(s) having the least prediction gain.

Prediction gain, $G_{PR}$, may be defined as follows:

$$G_{PR} = \frac{1}{64} \sum_{j=0}^{63} (B_{K,T}[j] - \overline{B}_{K,T}[j])^2 - (B_{K,T}[j] - \hat{B}_{K,T}[j])^2 \qquad (3)$$

Where $B_{K,T}$ is the current coding block in the current frame, $\overline{B}_{K,T}$ is the prediction of $B_{K,T}$ using a zero motion vector, and $\hat{B}_{K,T}$ is the coding block predicted using the actual motion vector. The prediction gain therefore is the improvement obtained from using a motion vector as opposed to assuming a zero motion vector. The motion vector having the least prediction gain is the motion vector for that block which provides the least improvement as compared to doing nothing at all (i.e., using a zero motion vector). The motion vector which yields the smallest $G_{PR}$ is accordingly discarded.

It should be noted that particular symbols or individual occurrences or groups of occurrences of one or more symbols may be discarded. Further, the criteria for discarding a particular symbol, occurrence or group of occurrences of one or more symbols may be based upon a least prediction gain, as in the illustrated embodiment, or alternatively, upon a relatively low probability of occurrence or a metric based upon rate distortion, to name two examples.

Re-computing the current Huffman Coding rate each time a symbol or an occurrence of a symbol is discarded is processing resource intensive. Further, the Huffman Coding rate, statistically, does not change substantially between iterations. The change in coding rate resulting from discarding a particular symbol, or one or more occurrences of a symbol, i.e., the difference between a new coding rate and the current coding rate is calculated, processing block 705.

Assume for example that there are N motion vectors, M of which are distinct, and that the rate of occurrence for each one is $R_i$. By definition:

$$\sum_{i=1}^{M} R_i = N. \qquad (4)$$

To determine the entropy of the alphabet of M symbols, the probability of symbol i is defined as $$\frac{R_i}{N}. \qquad (5)$$

The entropy ("H") is defined as:

$$H = \sum_{i=1}^{M} -\left(\frac{R_i}{N}\right) \log_2 \left(\frac{R_i}{N}\right). \qquad (6)$$

Using $R_i$ to generate a representative Huffman Code yields M symbols, in other words, one symbol for each distinct motion vector. Assume that the length of a given symbol is defined as $L_i$. If that Huffman Code is used to represent every motion vector, the total number of bits ("B") required will be:

$$B = \sum_{i=1}^{M} L_i R_i. \qquad (7)$$

The average length of a symbol in the Huffman Code ("$\overline{L}$") may be defined as:

$$\overline{L} = \sum_{i=1}^{M} \left(\frac{R_i}{N}\right) L_i. \qquad (8)$$

The following relationship therefore exists:

$$B = \overline{L}N. \qquad (9)$$

There is also a relationship between L and H, which is illustrated as:

$$H \leq \bar{L} \leq H+1. \tag{10}$$

The desired result may be arrived at by multiplying all sides of the above inequality by N, and substituting in B:

$$HN \leq B \leq (H+1)N. \tag{11}$$

The foregoing illustrates the relationship between the total number of bits needed to encode an alphabet using a Huffman Code and the entropy. Note as N becomes large, this range likewise becomes large. It is assumed however that Huffman Coders typically performs substantially close to the lower bound, and thus:

$$B \approx HN. \tag{12}$$

If $H_1$ represents the entropy of the motion vectors before discarding one occurrence, and $H_2$ represents the entropy after discarding that occurrence, the difference in bits may be expressed as:

$$\Delta B = H_1 N - H_2 (N-1). \tag{13}$$

The entropies differ therefore in a single term in the sum, since the only change has been in the rate of occurrence for one motion vector, which has decreased by one. Assuming that $R_i$ represents the rates of occurrence after discarding a motion vector, then $R'_i = R_i$ for all i except one, the $M^{th}$, wherein $R_M = R_M - 1$. Inserting the formulas for the entropies into the equation for $\Delta B$ results in the following:

$$\Delta B = N \sum_{i=1}^{M} -\left(\frac{R_i}{N}\right) \log_2 \left(\frac{R_i}{N}\right) - \tag{14}$$

$$(N-1) \sum_{i=1}^{M} \left(\frac{R'_i}{N-1}\right) \log_2 \left(\frac{R'_i}{N-1}\right),$$

$$\Delta B = \sum_{i=1}^{M} -R_i \log_2 \left(\frac{R_i}{N}\right) - \sum_{i=1}^{M} -R'_i \log_2 \left(\frac{R'_i}{N-1}\right), \tag{15}$$

$$\Delta B = -\sum_{i=1}^{M} R_i \log_2 R_i + \sum_{i=1}^{M} R_i \log_2 N + \sum_{i=1}^{M} R'_i - \sum_{i=1}^{M} R'_i \log_2 (N-1), \tag{16}$$

and $$\Delta B = -\sum_{i=1}^{M} R_i \log_2 R_i + \tag{17}$$

-continued
$$\log_2 N \sum_{i=1}^{M} R_i + \sum_{i=1}^{M} R'_i \log_2 R' - \log_2(n-1) \sum_{i=1}^{M} R'_i.$$

Given that $$\sum_{i=1}^{M} R_i = N \tag{18}$$

and that $$\sum_{i=1}^{M} R'_i = N - 1, \tag{19}$$

the forgoing may be further simplified:

$$\Delta B = -\sum_{i=1}^{M} R_i \log_2 R_i + N \log_2 N + \sum_{i=1}^{M} R'_i \log_2 R'_i - (N-1) \log_2 (N-1) \tag{20}$$

Note that most of the terms in the two sums cancel, except for the $M^{th}$, which results in an entropy estimation equation, namely:

$$\Delta B = -R_M \log_2 R_m + N \log_2 N + [R_M - 1] \log_2 [R_M - 1] - [N-1] \log_2 [N-1] \tag{21}$$

$\Delta B$ can thus be expressed as the sum of four terms. Each one of the four terms is of the form AlogA.

The difference estimation is subtracted from the current Huffman Coding rate which yields the new Huffman Coding rate, processing block 706. If the new current coding rate is still greater than the threshold coding rate, processing block 702 and decisional block 703, then the foregoing process steps are preferably repeated until the current coding rate is valid. Note that $R_M$ and N. in the illustrated embodiment, are both integral and have a finite range from 0 to 140. A look-up table of AlogA is preferably maintained, such as in the form of an array having 140 elements, for example. Alternatively, any other suitable data structure or conventional memory storage device may be utilized. $\Delta B$ may therefore be computed using four table look-ups and three additions.

Recall that a preferred embodiment for using and/or distributing the present invention is software. The software embodiment may be implemented in any suitable programming language. A "C" programming language implementation for performing the aforementioned processing steps is attached herewith as an appendix.

Although the present invention and its advantages have been described in detail, it should be understood that various changes, substitutions and alterations can be made herein without departing from the spirit and scope of the invention.

APPENDIX

```
/*************************************************************/
/* NewMVEncodingRate(MVEncodeRates *rat, int mv, int n, int
/*                    NumMV)                                  */
/*                                                            */
/* Inputs:   The old rates of occurrence, pointed to by rat, the  */
/*           motion vector to be dropped, the rate of occurrence */
/*           of the motion vector before dropping and the number of */
/*           motion vectors before dropping.                     */
/* Outputs:  The new coding rate for motion vectors after         */
/*           discarding one, using the entropy estimation.        */
/* Effects:  Computes the change in rate to the nearest integer.  */
/*           Fractional changes are taken care of in the calling  */
/*           function.                                            */
/* Notes:    NlogN is a global variable. It is 141 integers which */
/*           represent NlogN of the index, multiplied by four (for */
```

-continued

APPENDIX

```
/*         higher precision). MAX_ALPHA COUNT is the largest     */
/*         possible size for a rate of occurrence.               */
/******************************************************************/
void NewMVEncodingRate(MVEncodeRates *rat, int mv, int n, int
                       NumMV)
{
    int m;
    m = ((n < MAX_ALPHA_COUNT)?(n - 1): (n));
    rat—>LocalHuff_GlobalList
       -= ((n > 1)?(0):(MVHuffCode[mv].Length + MV_SYMBOL_COUNT_BITS);
         rat—>LocalHuff_GlobalList -= (NLogN[NumMV] -
             NLogN[NumMV - 1] + NLogN[m]     - NLoqN[n])>>2;
    rat—>LocalHuff_FixList
       -= (n > 1)?(0):(MV_FIXED_CODE_BITS + MV_SYMBOL_COUNT_BITS);
         rat—>LocalHuff_FixList -= (NLogN[NumMV] -
             NLogN[NumMV - 1] + NLogN[m] -      NLogN[n])>>2;
    rat—>GlobalHuff -= MVHuffCode[mv].Length;
    rat—>Fixed -= MV_FIXED_CODE_BITS;
}
```

I claim:

1. A method for generating an output signal representing a coding rate for use in compressing a digital signal, said digital signal including a plurality of digital sets representing the symbols to be coded wherein at least one of said plurality of digital sets is non-unique, said method comprising the steps of:

(a) receiving a signal representing a current coding rate;

(b) comparing said current coding rate with a threshold coding rate to determine whether said current coding rate satisfies a predetermined criterion;

(c) discarding selectively, upon a determination that said current coding rate fails to satisfy said predetermined criterion, at least one of said plurality of digital sets, determining a rate difference resulting from selectively discarding said at least one of said plurality of digital sets, and recalculating said current coding rate using said rate difference; and (d) generating said output signal using said current coding rate.

2. The method as set forth in claim 1 further including the step of Huffman Coding said digital signal utilizing said output signal.

3. The method as set forth in claim 1 further including the steps of:

receiving an analog signal; and converting said analog signal to said digital signal.

4. The method as set forth in claim 3 wherein said analog signal is a video signal, and further includes the step of storing said video signal on a video frame by video frame basis.

5. The method as set forth in claim 4 further including the step of segmenting said stored digital signal into a plurality of digital segments.

6. The method as set forth in claim 5 further including the step of determining at least one motion vector for at least one of said plurality of digital segments.

7. The method as set forth in claim 6 wherein a first digital segment is present in a first video frame and a second video frame, and said determining step further includes the step of searching for said first digital segment in said first video frame.

8. The method as set forth in claim 7 further including the step of comparing at least one of said motion vectors with a threshold value.

9. The method as set forth in claim 8 further including the step of initializing, in response to said comparison step, at least one of said motion vectors.

10. The method as set forth in claim 1 wherein said selectively discarding step further includes the step of determining a least prediction gain for at least one of said plurality of digital sets.

11. The method as set forth in claim 1 wherein said selectively discarding step further includes the step of identifying at least one of said plurality of digital sets having a relatively low probability of occurrence associated therewith.

12. The method as set forth in claim 1 wherein in step (c) said rate difference is determined using the following equation:

$$\Delta B = -R_M \log_2 R_M + N \log_2 N + [R_M - 1]\log_2[R_M - 1] - [N-1]\log_2[N-1].$$

wherein $R_M$ is the rate of occurrence before a first digital set is discarded, N is the total number of digital sets before said first digital set is discarded, $R_{M-1}$ is the rate of occurrence after said first digital set is discarded, and N−1 is the total number of digital sets after said first digital set is discarded.

13. The method as set forth in claim 12 wherein $R_M$ and N have a finite set of values, and said method further includes the step of determining $A\log_2 A$ for all values of $R_M$ and N wherein A is one of $R_M$ and N.

14. The method as set forth in claim 12 wherein $R_M$ and N have a finite set of values and said method further includes the step of retrieving $A\log_2 A$, wherein A is one of $R_M$ and N, from a memory storage device.

15. The method as set forth in claim 1 wherein said selectively discarding step includes the step of returning to step (b).

16. An apparatus for generating an output signal representing a coding rate for compressing a digital signal, said digital signal including a plurality of digital sets representing the symbols to be coded wherein at least one of said plurality of digital sets is non-unique, said apparatus comprising:

means for receiving an electric signal representing a current coding rate for compressing said digital signal; and processing means for generating said output signal, said processing means operable to:

compare said current coding rate with a threshold coding rate to determine whether said current coding rate satisfies a predetermined criteria, and upon a determination that said current coding rate does not satisfy said predetermined criteria, said processing means is further operable to:

discard selectively at least one of said plurality of digital sets;

determine a rate difference resulting from selectively discarding at least one of said plurality of digital sets; and recalculate said current coding rate using said rate difference.

17. The apparatus as set forth in claim 16 wherein said processing means is further operable to generate said output signal using said current coding rate.

18. The apparatus as set forth in claim 16 wherein said processing means, upon a determination that said current coding rate does not satisfy said predetermined criteria, is further operable to compare said recalculated current coding rate with said threshold coding rate to determine whether said recalculated current coding rate is valid.

19. The apparatus as set forth in claim 16 wherein said processing means is further operable to Huffman Code said digital signal utilizing said output signal.

20. The apparatus as set forth in claim 16 wherein said apparatus further includes:

an input port for receiving an analog signal; and an analog to digital converter for converting said analog signal to said digital signal.

21. The apparatus as set forth in claim 20 wherein said analog signal is a video signal, and said processing means is further operable to store said video signal on a video frame by video frame basis in a storage means.

22. The apparatus as set forth in claim 21 wherein said processing means is further operable to segment said stored digital signal into a plurality of digital segments.

23. The apparatus as set forth in claim 22 wherein said processing means is further operable to determine at least one motion vector for at least one of said plurality of digital segments.

24. The apparatus as set forth in claim 23 wherein a first digital segment is present in a first video frame and a second video frame, and said processing means is further operable to search for said first digital segment in said first video frame.

25. The apparatus as set forth in claim 24 wherein said processing means is further operable to compare at least one of said motion vectors with a threshold value.

26. The apparatus as set forth in claim 25 wherein said processing means is further operable to initialize, in response to said comparison, at least one of said motion vectors.

27. The apparatus as set forth in claim 16 wherein said processing means is further operable to determine a least prediction gain for at least one of said plurality of digital sets.

28. The apparatus as set forth in claim 16 wherein said processing means is further operable to identify at least one of said plurality of digital sets having a relatively low probability of occurrence associated therewith.

29. The apparatus as set forth in claim 16 wherein said processing means is operable to determine said rate difference using the following equation:

$$\Delta B = R_M \log_2 R_M + N \log_2 N + [R_M - 1] \log_2 [R_M - 1] - [N - 1] \log_2 [N - 1],$$

wherein $R_M$ is the rate of occurrence before a first digital set is discarded, N is the total number of digital sets before said first digital set is discarded, $R_{M-1}$ is the rate of occurrence after said first digital set is discarded, and N−1 is the total number of digital sets after said first digital set is discarded.

30. The apparatus as set forth in claim 29 wherein $R_M$ and N have a finite set of values, and said processing means is further operable to determine $A\log_2 A$ for all values of $R_M$ and N wherein A is one of $R_M$ and N.

31. The apparatus as set forth in claim 29 wherein $R_M$ and N have a finite set of values and said apparatus further includes storage means, and said processing means is further operable to retrieve from said storage means $A\log_2 A$ wherein A is one of $R_M$ and N.

32. The apparatus as set forth in claim 16 wherein said processing means includes at least one processing unit.

33. The apparatus as set forth in claim 16 wherein a storage means is further operable to store a plurality of processing system instructions for directing said processing means to process said input signal to generate said output signal.

34. The apparatus as set forth in claim 33 wherein said processing means is further operable to retrieve and execute selected ones of said plurality of processing system instructions.

35. A method for selectively reducing a current coding rate to generate an electric output signal for use in compressing a digital signal, said digital signal including a plurality of digital sets representing the symbols to be coded wherein at least one of said plurality of digital sets is non-unique, said method comprising the steps of:

(a) receiving an electric input signal representing said current coding rate;

(b) comparing said current coding rate with a threshold coding rate;

(c) determining whether said current coding rate satisfies a predetermined criterion, and in response to said determination, said method, further comprising the steps of:

selectively discarding at least one of said plurality of digital sets;

estimating a rate difference resulting from selectively discarding at least one of said plurality of digital sets;

recalculating said current coding rate using said estimated rate difference; and returning to step (b);

(d) generating said output signal using said current coding rate.

* * * * *

UNITED STATES PATENT AND TRADEMARK OFFICE
CERTIFICATE OF CORRECTION

PATENT NO : 5,872,599

DATED : February 16, 1999

INVENTOR(S): Jonathan D. Rosenberg

It is certified that error appears in the above-identified patent and that said Letters Patent is hereby corrected as shown below:

Title page, items [19] and [75],
Please correct the spelling of the last name of the inventor on both occurrences on the cover page from "Rosenbrg" to --Rosenberg--.

Signed and Sealed this

Twenty-fourth Day of August, 1999

*Attest:*

Q. TODD DICKINSON

*Attesting Officer*     *Acting Commissioner of Patents and Trademarks*